United States Patent Office 3,147,770
Patented Sept. 8, 1964

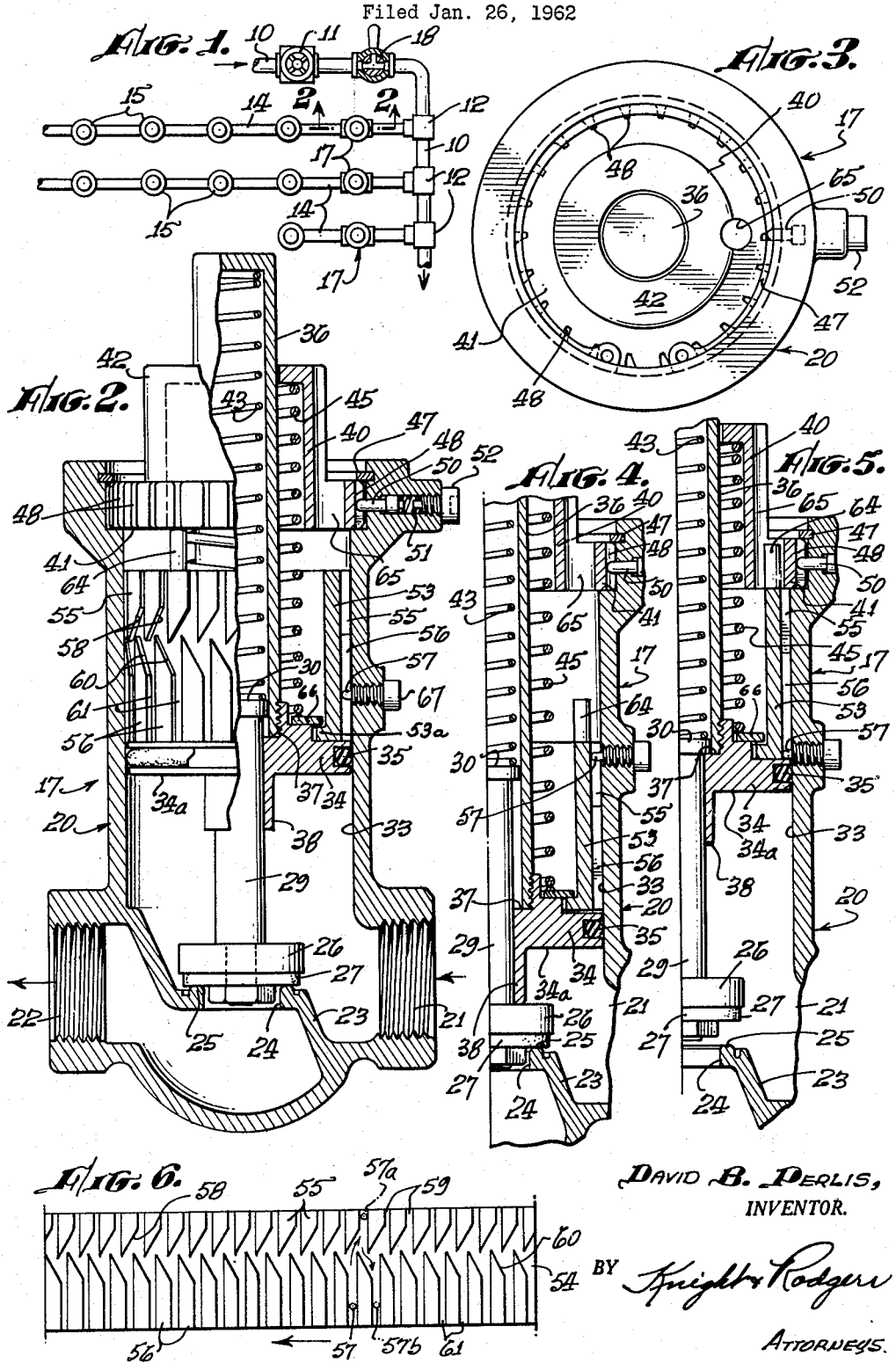

3,147,770
CYCLING VALVE
David B. Perlis, Sun Valley, Calif.
(955 Cornish Drive, San Diego 7, Calif.)
Filed Jan. 26, 1962, Ser. No. 168,966
13 Claims. (Cl. 137—624.13)

The present invention relates generally to valves for controlling the flow of fluid through a conduit, and more especially to a cycling valve which is responsive to fluid pressure pulses to step the valve through a predetermined sequence of positions, which may include any desired sequence of open or closed positions of the valve.

In fluid distribution systems having a plurality of branches or laterals connected to a main conduit, it is often desirable to switch fluid flow between the branches of the system in a predetermined sequence from a single control position. Examples are sprinkler systems for domestic lawns or, on a larger scale, for orchards and other commercial crops that ordinarily employ a plurality of branch lines fed from a common source, each branch line having one or more sprinklers in it which cover an assigned portion of the area to be irrigated. It is generally inconvenient or impossible to operate all sprinklers simultaneously because the water pressure is inadequate to do so. Consequently, it is accepted practice to operate groups of sprinklers in a predetermined pattern since each sprinkler more adequately covers the area assigned to it because a higher water pressure is maintained in the system, a condition which is particularly true in the case of rotary sprinklers which do not function properly when the water pressure drops below the minimum required to produce the necessary rotary movement of the sprinklers. Even with non-rotary sprinklers, a drop in water pressure may result in incomplete coverage of the area assigned to each sprinkler.

Cycling valves of the type herein disclosed are placed in the respective branches of the fluid distribution system to control one or more sprinklers in each branch. The initial state of each valve and its sequence of operations is predetermined to provide a desired sequence of water flow to the respective branches and sprinklers therein controlled by the cycling valves. The cycling valves are synchronously stepped through their respective sequences by a series of pressure pulses created by interruptions in fluid flow. They are generated at some convenient point in the distribution system and transmitted by the fluid therein to each cycling valve.

For purposes of description, a pressure pulse is considered to be a rise and fall in fluid pressure, not necessarily starting at zero pressure or returning to zero but passing through a predetermined range which is greater than the nomal fluctuations occurring in the distribution or irrigating system. The rise or fall in pressure of the pulse may occur first in an operating cycle depending on the starting point assumed for a cycle; but ordinarily with the normally closed valve described herein it is preferable to consider that the pressure pulse starts with a drop in pressure and is completed by the succeeding rise in pressure.

A general object of the present invention is to provide a cycling valve, operated by hydraulic pressure pulses, which is movable through successive, predetermined states or positions to control fluid flow, the movement taking place by fluid pulses applied through the fluid of which the flow is controlled by the valve.

A more specific object of the present invention is to provide a cycling valve of this general type which is normally closed to shut off flow through a branch line controlled by the valve and which can be moved by the application of a sequence of pressure pulses through a sequence of different positions including one or more open positions of the valve.

These and other objects of the invention are attained in a cycling valve constructed according to the present invention by providing a body having fluid inlet and outlet openings and a fluid port located within the body at a position between said openings. Valve seat means is located at the port. In cooperation therewith a movable valve member controls fluid flow through the port, said valve normally occupying a position in engagement with said seat to close the port to fluid flow and being movable away therefrom to open the port. The valve means is moved away from the port by a piston movable within the body and exposed to the pressure of fluid entering the body through the inlet opening. The piston and the valve means are slidably connected by suitable means which engages the piston and the valve means as the piston approaches one end of its range of travel. Suitable spring means normally urges the piston and the valve means toward the fluid port in opposition to force exerted on the piston by fluid pressure. A cam and follower arrangement is provided that includes two sets of cam faces oppositely inclined to the direction of travel of the piston, and producing angular movement of the cam during each axial movement of the piston, whereby the cam and an attached element of the abutment means are rotated to a series of angularly spaced positions. Abutment means are provided which normally stop the piston movement in a direction away from the port short of the maximum limit of its travel and therefore short of engagement with the valve means. Said abutment includes a pair of cooperative members, one fixed and one movable which have means, such as a pin and recess to receive the pin, allowing the piston in at least one rotational position of the cam to move for its full range of travel to engage the valve means and move the valve away from the port, opening the port to fluid flow through the valve body.

This application is in the nature of an improvement on or variation in the valve shown and claimed in my copending application Serial No. 843,268, filed September 29, 1959 for "Fluid Branch Switching System," now Patent No. 3,018,788 granted Jan. 30, 1962.

How the above objects and advantages of my invention, as well as others not specifically referred to herein, are attained will be more readily understood by reference to the following description and to the annexed drawing, in which:

FIG. 1 is a diagram of a sprinkler system utilizing a cycling valve in each of the branch lines to control the flow of water therein to one or more sprinklers thereon.

FIG. 2 is a vertical median section of a preferred embodiment of a hydraulic cycling valve, the valve being shown in a closed position.

FIG. 3 is a top plan view thereof.

FIG. 4 is a fragmentary vertical median section thereof showing the piston in the lowered position, as during the low pressure portion of a pulse.

FIG. 5 is a fragmentary vertical median section showing the piston at extreme position away from the valve seat with valve in the open position.

FIG. 6 is a developed elevation of the sequence determining cam carried by the piston.

FIG. 1 illustrates diagrammatically an irrigating system comprising a main supply line 10 in which the main control valve 11 controls the supply of water to the irrigating system. By means of T-connections 12 a plurality of laterals or branch lines 14 are connected to the main line 10. Each of the branch lines 14 is provided with one or more of sprinklers 15 which may be of any suitable type, but for purposes of disclosure are shown as fixed spray heads. In each of branch lines 14 at a position adjacent to the main supply line 10, is a cycling valve 17, the novel construction and operation of which will be explained. In domestic installations for lawns, each branch may have several spray heads controlled by a single cycling valve 17. In agricultural installations it is often customary to have larger sprinklers and to control each sprinkler individually with a single cycling valve. Cycling valves 17 are each responsive to temporary interruptions of flow in supply line 10 and accordingly can be operated by creating in line 10 pressure pulse caused by opening and closing the three way valve 18. This latter valve may be either manually operated or remotely controlled in any suitable manner. Pressure pulses also may be produced by operation of the main supply valve alone provided it has suitable characteristics to permit a pressure drop, as described later.

The construction of a cycling valve 17 is disclosed in FIGS. 2–5. As will be seen particularly from FIG. 2, the valve comprises a hollow body 20 provided with a fluid inlet opening 21 and a fluid outlet opening 22, preferably located at opposite sides of the body. Between the inlet and oulet openings, is a web 23 in which is port 24 surrounded by annular valve seat 25. Assuming that the valve is in the upright position as illustrated and that the inlet and outlet openings are substantially horizontally disposed with respect to each other, the valve seat 25 faces upwardly and the axis of port 24 likewise extends upwardly. This is a normal installation; but it is an advantageous feature of this invention that the valve will operate satisfactorily in other positions. Thus the valve can be installed in a riser with port 22 above port 21 and the piston axis horizontal.

Flow of fluid between the inlet opening 21 and outlet opening 22 takes place through port 24; and fluid flow through the port is controlled by suitable valve means comprising valve disc 26 carrying a resilient facing 27 which is adapted to engage the upper rim of valve seat 25, said rim preferably being planar. When these elements are in engagement as illustrated in FIG. 2, port 24 is closed and fluid flow through the valve is prevented. It will be noted that in this position pressure from fluid entering the valve body through inlet 21 is exerted on the upper face of valve disc 26 in a direction to assist in holding the valve closed. The valve disc has attached to it valve stem 29 which extends upwardly from the disc and is provided at its upper end, which is the end remote from disc 26, with head 30 which is of larger diameter than the lower portion of the valve stem in order to provide a downwardly facing shoulder on the head, the purpose of which will be explained.

The upper portion of valve body 20 has an internal cylindrical bore 33 within which piston 34 is movable. Bore 33 is in free communication at its lower end with inlet opening 21. An O-ring seal 35 carried by the piston engages the wall of bore 33 and prevents water entering bore 33 from inlet opening 21 from leaking past the piston. The underside or working face 34a of the piston is subject to the pressure of fluid entering the body through this inlet opening. Piston 34 carries a centrally located hollow tube 36 which is closed at its outer end and open at its inner end to receive valve stem 29 and head 30 thereon. It will be noted that the bore through the piston head to pass the valve stem has a diameter slightly smaller than the internal diameter of tube 36, thus providing an upwardly facing shoulder at 37 which is engageable with the underside of head 30 on the valve stem. As will be explained further, after shoulder 37 engages head 30 as a result of travel of the piston away from valve seat 25, continued movement of the piston carries the valve with it to raise the valve means from the seat to the open position shown in FIG. 5, thus permitting fluid to flow between the inlet and outlet openings of the body. The piston has a sleeve guide 38 engaging and directing stem 29.

The upper end of body bore 33 is closed by a cap or closure member 40 of any suitable design but which preferably comprises a lower disc portion 41 and an upper central external extension 42 which provides a knob by means of which disc 41 may be manually rotated relative to the valve body. The upper end wall of knob 42 is centrally apertured in order that tube 36 may project outwardly beyond the knob. This is a means of providing the necessary range of travel of tube 36 and piston 34 without unnecessarily increasing the size of the valve body. The projecting tube also provides a means for manually reciprocating piston 34 and the cam described later; and the length of the tube projecting out of the cap 40 gives visual indication of the position of the piston and of valve 26.

Suitable spring means are provided normally urging both the valve means and the piston toward valve seat 25 and the associated fluid port 24. The spring means is preferably two elements. The first element is compression spring 43 interposed between the valve and the piston which urges the valve toward the valve seat and normally urges the valve away from the piston so that these parts occupy the relative positions shown in FIG. 1. Such compression spring 43 may conveniently be placed within hollow tube 36 where it bears at one end against head 30 on the valve stem and at the other end against the closed end of tube 36, which is considered as part of piston 34. The second element of the spring means is compression spring 45 located externally of tube 36 and interposed between piston 34 and the upper end wall of knob 42. Knob 42 is considered to be a portion of valve body 20 since it is normally stationary with respect to the piston and is carried by the body. Cap 40 is held in place in the body bore against the force of spring 45 by any suitable means, such as split ring 47 which is a preferred type of retaining means as it allows disc 41 to be turned manually to a selected position for adjusting as described below For reasons that become obvious, spring 45 is a heavier or stronger spring than spring 43 so that when it is free to expand it is able to compress spring 43 and move valve disc 26 against seat 25

It is preferred that disc 41 be provided with a series of equally spaced grooves 48 or other suitable indentations around its periphery for the purpose of cooperating with detent means restraining the disc from rotation. Although other designs of detent means may be employed, it is preferred to provide for this purpose pin 50 urged toward the disc by spring 51 located in a radially extending bore in the valve body and held in place by screw 52. The pin 50 is designed to enter grooves 48 in order to resist rotation of the closure member 40; and the degree of resistance provided by the detent means can be varied by means of screw 52 to change the force exerted by spring 50. For example, if screw 52 is backed off, disc 42 may be rotated with relative ease whereas as if the screw is screwed in tightly, pin 50 may be forced into a groove 48 with sufficient force that the cap 40 is firmly locked in place.

As may be seen in FIG. 3, it is advantageous to bevel one edge of all grooves 48 in order to provide a camming action on pin 50 at the beveled edge of the groove. Thus by beveling the trailing edges of all the grooves as shown in FIG. 3, the cap may be rotated in a clockwise direction with relative ease, whereas it cannot be rotated in the opposite direction without entirely withdrawing detent pin 50. Thus grooves 48 and pin 50 cooperate to permit rotation of disc 41 in one direction only.

Cam and follower means are provided for rotating the piston about its axis by fixed steps during axial travel of the piston. Cam 53 has a cylindrical body that has formed in its outer surface two opposing sets of sawtoothed cam elements which define a zig-zag channel extending around the periphery of the piston. These cam elements, shown in detail in FIG. 6, comprise an upper row of individual cam elements 55 and a lower row of individual cam elements 56. Cooperating with these cam elements is a follower in the form of a pin 57 mounted on the inner end of screw 67 threaded into a radially extending bore in the wall of cylinder bore 33.

The upper cam elements 55 are each raised above the surrounding surface of the cylindrical body of the cam and each have two parallel, axially extending side surfaces joined by an end surface 58 which is inclined relative to the axis of the piston and the direction of its axial movement. Cam elements 55 are equally spaced apart and provide between them a series of spaced, axially extending slots 59 in which the pin 57 rides.

The lower cam is likewise constructed of a plurality of similar elements 56 which are equally spaced around the periphery of the piston and each of which has two parallel, axially extending side surfaces joined by an inclined end surface 60. It will be noted that the end surfaces 60 are inclined to the axis of the piston in a direction opposite to the inclination of end surfaces 58 of the upper cam elements 55. Between each two successive cam elements 56 is a narrow slot 61 which can receive pin 57. The elements 56 are all angularly offset in one direction from the corresponding elements 55 so that the slots 61 are opposite inclined surfaces 58 of the upper row of cam elements and in a similar manner slots 59 are opposite the inclined end surfaces 60 of the lower row of cam elements.

Slots 59 are open at their upper ends to the top of the piston, as may be seen in FIG. 2, although this is not necessary. To the contrary, it will be noted that the head of the piston closes the lower ends of slots 61. It is only required that the slots 59 and 61 be long enough axially to permit the required axial travel of piston 34 while follower pin 57 is in the slots.

Contact of pin 57 alternately with cam surfaces 58 and 60 produces angular movement of the cam. It is preferable not to rotate piston 34 since that produces no useful result and the frictional drag of the O-ring seal retards the desired angular advance of the cam. For this reason the cam is coupled loosely to the piston in a manner permitting the cam to turn independently of the piston but at the same time tieing the cam and piston together for axial movement in unison. The lower end of cam 53 has an inwardly turned flange 53a. On top of this flange and on an adjacent shoulder on the piston rests a ring 66. Spring 45 bears on ring 66 to urge both the cam and piston down. When the piston is forced up by water pressure, it engages the end of cam 53 to carry it upward. It is preferred to have a slight clearance between flange 53a and the ring above or piston below to minimize any drag on the cam resisting its rotation.

This arrangement minimizes or eliminates torque on the cam from the spring in a direction opposite to the desired clockwise rotation of the cam. During the transfer of pin 57 from a slot 59 to a slot 61 the pin is more or less free of the cam surfaces and any tendency to reverse rotation can disengage the pin from an inclined cam surface. Successful operation is achieved by eliminating as far as possible any reverse torque on the cam that would oppose or interfere with proper contact with the follower and movement of the cam.

Travel of piston 34 away from valve seat 25 is limited by abutment means comprising a fixed member and a cooperating movable member. The fixed member is cap 40, or more partciularly disc portion 41 thereof. The movable member of the abutment means is a projecting portion of cam 53 in the form of pin 64 which is engageable with the underside of disc 41. When such engagement takes places, as shown in FIG. 2, it limits the axial travel of the cam and piston upwardly within bore 33 as a result of fluid pressure applied to the working or under-face of the piston; and the travel of the piston is short of that position in which shoulder 37 engages the underside of valve stem head 30.

The fixed abutment member 40 is provided in at least one rotational position, and in more than one if desired, with suitable means allowing a greater range of piston travel. Typical of such means is recess or opening 65 adapted to receive pin 64 when these two elements are axially aligned. In such aligned position, the pin 64 enters the opening 65 as shown in FIG. 5 and as a consequence the range of travel of the piston is increased by the length of pin 64 to the full range possible before the end of the piston engages the underside of disc 41. This extended range of travel is now sufficient, as shown in FIG. 5, for shoulder 37 on the piston to engage the underside of valve stem head 30 and carry the valve upwardly away from valve seat 35 as a result of the piston movement, thus opening port 24 to fluid flow.

The two sets of cam surfaces 58 and 60 are the active cam faces for rotating the piston. It is by contact with these inclined surfaces that the angular movement of the piston is produced, the total angular movement for each fluid pressure pulse being divided into two portions since follower pin 57 engages a surface 58 and a surface 60 during reciprocation of the piston caused by a complete pressure pulse. The inclination of these terminal cam surfaces 58 and 60, shown in FIG. 6, is designed to produce clockwise movement of piston 34, when viewed from above. Movement in either direction is equally practical.

Generally speaking, the sequential switching action of valve 11 is derived from axial movement of piston 34 in response to pressure pulses in the fluid entering through inlet port 21. The area of working face 34a of the piston is sufficient that, for the pressure of water entering through inlet opening 21, the piston is raised to the position of FIG. 2, by the upward force exerted by the static water pressure existing in the lower portion of bore 33 with valve 26 closed. This upward force overcomes the opposing force of spring 45 and compresses the spring 45 above the piston.

Spring 43 normally urges valve disc 26 downwardly away from piston 34 and into engagement with valve seat 25, thus closing port 24. As commented on before, the pressure of the water above the valve exerts a force on valve disc 26 in a direction to hold it against seat 25.

Upon a sufficient reduction of pressure in the lower portion of cylinder 33, but not necessarily a reduction to zero, spring 45 overcomes the upward pressure of the water on the piston, driving the piston downwardly and compressing spring 43, until the piston reaches the position of FIG. 4 in which it engages fixed abutment 68 on the valve body. This downward stroke of the piston produces angular movement of the piston by virtue of engagement of follower pin 57 with a cam surface 58.

By reference to FIG. 6, it will be seen that pin 57 starting from a position (shown in solid lines) in one of slots 61 moves upward, relative to the piston and the cams thereon, into engagement with an inclined face 58, the pin moving into a slot 59 to the position 57a. This engagement of the follower with the cam face 58 rotates the piston by an angle equal to the angular spacing between a slot 51 and the next successive slot 59.

In the second half of the pressure pulse, the pressure in the lower portion of bore 33 is increased, again driving the pitson upwardly and compressing spring 45. It is assumed that the piston travel is limited to a position short of engagement with the valve stem by virtue of contact of pin 64 with disc 41. During this upward travel of the piston upwardly and compressing spring 45. It is of FIG. 6 downwardly relative to the piston and the cam thereon into engagement with an inclined surface 60 and then into slot 61. By engagement with the inclined cam surface 60, the piston is again given a rotational movement which is equal to the angular spacing between a slot 59 and the next succeeding slot 51. Thus for a complete pressure pulse there are two angular movements of the piston, one on each stroke, which combined equal the angle between successive slots 61. The pin 57 has now reached the position 57b.

The pressure pulses may be repeated moving the piston in the manner described until pin 64 reaches a position in which it is axially aligned with the opening 65 in abutment 40. This allows a greater travel of the piston terminating when the piston engages the abutment in the manner shown in FIG. 5. As a consequence of the greater range of travel of the piston, the valve is opened because shoulder 37 on the piston engages the under-side of valve stem head 30 and lifts the piston off of valve seat 25. To insure that this action takes place, the diameter of valve disc 26 is kept within proper limits, as determined by the pressure of water entering opening 21, so that sufficient force is exerted on the piston to lift the piston and the valve away from valve seat 25.

The number of rotational positions at which piston 34 stops is determined by the number of slots 61, there being of course an equal number of slots 59. In the design of valve here illustrated, there are twenty two such positions for practical reasons; but it will be realized that the number may be changed as desired. A valve with twenty two such positions is adapted to be used in a system having twenty two or fewer laterals 14, each having a valve 17 and one or more sprinklers. It will be realized that a system may have a smaller number of laterals than twenty two without requiring a change in the valve, the result merely being that for a few pressure pulses none of the valves 17 is opened.

The valve illustrated has a single rotational position in which the valve is open to permit flow through it. It will be realized that more than one opening 65 may be provided if desired, thus establishing more than one rotational position of the piston in which the extended range of travel is possible and therefore more than one open position of the valve for each complete rotation of piston 34. For example, a cam with twelve angular positions can be combined with caps 40 having one, two, three, or four equally spaced openings 65 to obtain a variety of operating sequences merely by interchanging caps 40.

In an irrigating system having a plurality of laterals 14, as illustrated in FIG. 1, each of the branches contains a valve 17 which is a duplicate of the one described above. In large agricultural systems each branch may have a single sprinkler covering a large area. Ordinarily it is desired to have only one branch in operation at a time and to have the branches come into operation in a predetermined sequence which is controlled by the cycling valves. Accordingly, the initial position of each valve 17 relative to the other cycling valves is set to a different step in the sequence of positions of cam 53. This sequence is such that only one valve is open at a time and the valves open in the desired sequence.

While the initial state of the valves can be set in various ways, it is generally preferred to do this after the valves are installed and a description of one method of so doing will give an adequate understanding of this procedure. Assume an irrigating system having twenty two laterals and a valve as described having twenty two different rotational positions of the cam. If all valves are now set to the open position of FIG. 5 they are all in the same initial position. This can be accomplished by backing off screw 52 and rotating disc 41 by means of knob 42 until pin 64 enters recess 65, allowing the piston to move upwardly for the full range of possible travel. Leaving in the open position the valve first to be placed in operation, the valve next to be in operation is set by depressing tube 36 to remove pin 64 from recess 65 and disc 41 is then rotated clockwise to bring the next groove 48 opposite detent 50. Since there are twenty two grooves 48 equally spaced apart, the angle between successive grooves 48 is the same as the angle between successive slots 61. Thus at the end of one pressure pulse this second valve will be open and the first one will be closed.

In a similar manner the valves to be operated in succession are set respectively by rotating the disc 41 to bring the second, the third and succeeding notches at the respective valves opposite pin 50. Thus grooves 48 and detent pin 50 act as a means for indexing the position of recess 65 with respect to the cam in order to determine the angular position of the cam at which the valve is opened. With this assumed arrangement a different one of the laterals will be placed in operation for each of twenty two successive pressure pulses after which the cycling valves will repeat the same cycle of valve operations.

Turning knob 42 and disc 41 often leaves some residual torque in spring 45. If this torque is clockwise it is harmless; but if it is counterclockwise it tends to drive cam 53 in the wrong direction. Consequently grooves 48 around disc 41 are designed to permit rotation of the disc, while engaged by detent 50, only in the direction of travel of cam 53. The residual torque results from the friction at the ends of the spring when it bears against knob 42 or ring 66 which prevents the ends of the spring from slipping enough to equal the movement of the surfaces. To avoid adverse effects various means are provided, such as rotation of the cam independent of the piston and unidirectional rotation of disc 41. Other means may be provided also.

Various other changes may be made in the valve without any change in its operation. For example the location of pin 64 and opening 65 can be reversed. The pin can be mounted upon abutment member 40 and the recess to receive the pin be placed in cam 53. Also, the abutment means may be combined with follower 57 and the cam elements 56 in such a way that the slots 61 are closed at their lower end to engage the follower and limit piston travel. Slots 61 are not all of equal length as shown but some of them are longer, allowing corresponding greater travel of the piston, but the upward travel of the piston is limited by engagement of follower 57 with the piston at the bottom of each slot 61. This is in accord with the principle of construction and operation of the valve fully disclosed in my co-pending patent application, Serial No. 843,268, referred to above, and to which reference may be made for a more extended discussion of this feature.

Thus it will be evident that the above as well as other changes in the construction and arrangement of the parts of my improved valve may occur to a person skilled in the art without departing from the spirit and scope of my invention. Accordingly, it is to be considered that the foregoing description is illustrative of, rather than limitative upon, the invention defined in the appended claims.

I claim:

1. A cycling valve for controlling fluid flow, comprising the combination of:

a hallow body having spaced fluid inlet and outlet openings and a fluid port between said openings;

seat means at the port;

valve means movable into engagement with the seat and away therefrom to control fluid flow through the port;

a piston movable within the body;

means slidably coupling the piston to the valve means to engage the valve means near one end of the axial travel of the piston to move the valve means away from the seat;

spring means normally urging the piston and the valve means toward the seat, said piston moving away from the seat in opposition to the spring means and in response to fluid pressure thereon exerted by fluid entering the body through the inlet opening;

said spring means comprising a first spring between the valve means and the piston and a second spring between the piston and the housing, the second spring being stronger than the first;

abutment means comprising a fixed member, and a movable member coupled to the piston to move axially therewith and also rotatable about the axis of the piston, said abutment means limiting travel of the piston away from the seat when the movable member is in at least one rotational position to position the piston short of moving the valve means away from the seat;

means for overcoming the limiting function of said abutment means in at least one rotational position of the movable member so as to permit travel of the piston away from the seat sufficient to move the valve away from the seat;

and cam and follower means rotating the movable abutment member during movement toward and away from the seat to successive rotational positions.

2. A cycling valve as in claim 1 in which the means slidably connecting the piston and the valve means comprises a stem centrally mounted on the valve means and having at its outer end an enlarged head; a hollow tube carried by the piston and receiving the valve stem and head; and a shoulder on the piston engageable with the head on the valve stem as the piston approaches one end of its travel in the body.

3. A cycling valve as in claim 1 in which the fixed member of the abutment means is adjustable to selected rotational positions and which also includes means permitting rotation of the fixed member in one direction only.

4. A cycling valve for controlling fluid flow, comprising in combination:

a hollow body having inlet and outlet openings near one end, a web having therein a stationary fluid port through which fluid flows between the inlet and the outlet, and a cylinder cavity at one side of the port;

seat means at the port;

valve means movable into and out of engagement with the seat means to control fluid flow through the port;

piston means within the cylinder cavity and movable toward and away from the seat, said piston means being disposed with both the inlet and outlet openings at one side of the piston means;

means slidably coupling the piston to the valve means to engage the piston near one end of the piston travel to move the valve means away from the seat;

spring means normally urging the piston and valve toward the seat means, said piston moving in opposition to the spring means in response to fluid pressure thereon exerted by fluid in the cylinder cavity entering through the inlet opening;

means preventing flow of fluid past the piston means in the cylinder cavity;

abutment means comprising a fixed member and a movable member coupled to the piston to travel therewith and rotatable about the axis of the piston, said members of the abutment means limiting travel of the piston means away from the seat when the movable member is in selected rotational positions to stop the piston means short of moving the valve means away from the seat and including means operative in at least one rotational position of the movable member to permit extended travel of the piston means away from the seat sufficient to move the valve means away from the seat;

and cam and follower means rotating the movable abutment member during movement thereof toward and away from the seat to successive rotational positions.

5. A cycling valve as in claim 4 in which the cam and follower means comprises a plurality of cam surfaces coupled to the piston and including a first set of surfaces inclined to the piston axis and a second set of surfaces oppositely inclined to the piston axis, and a fixed pin carried by the body and engaging alternately surfaces of the first and second sets to produce angular movement of the piston during each axial movement thereof.

6. A cycling valve as in claim 4 which also includes sealing means carried by the piston preventing leakage of fluid past the piston from the working face thereof.

7. A cycling valve as in claim 4 in which the cam means includes a sleeve coupled to the piston to move therewith axially but is free to turn independently of the piston.

8. A cycling valve as in claim 7 that also includes means substantially eliminating reverse torque applied to the cam means from the spring means.

9. A cycling valve for controlling fluid flow, comprising the combination of:

a hollow body having spaced fluid inlet and outlet openings and a fluid port between said openings;

seat means at the port;

valve means movable into engagement with the seat and away therefrom to control fluid flow through the port;

a piston movable within the body;

means slidably coupling the piston to the valve means to engage the valve means near one end of the axial travel of the piston to move the valve means away from the seat;

spring means normally urging the piston and the valve means toward the seat, said piston moving away from the seat in opposition to the spring means and in response to fluid pressure thereon exerted by fluid entering the body through the inlet opening;

abutment means comprising a fixed member mounted on the valve body and a movable member including a stop pin coupled to the piston to travel axially therewith and also rotatable about the axis of the piston;

and cam and follower means, said cam carrying said stop pin at one end of the cam and rotating the pin during movement toward and away from the seat to successive rotational positions;

said pin engaging the fixed abutment member to limit travel of the piston away from the seat when the pin is in at least one rotational position to locate the piston short of moving the valve means away from the seat, the fixed member having at least one recess to receive the stop pin to permit extended piston travel sufficient to move the valve means away from the seat in at least one rotational position of the pin.

10. A cycling valve as in claim 9 in which the fixed member is rotatably mounted on the housing to bring the recess therein opposite the stop pin at any one of a number of different angular positions of the piston.

11. A cycling valve as in claim 10 which also includes detent means holding the fixed member in a selected position.

12. A cycling valve for controlling fluid flow, comprising the combination of:

a hollow body having spaced fluid inlet and outlet openings and a fluid port between said openings;

seat means at the port;

valve means movable into engagement with the seat and away therefrom to control fluid flow through the port;

a piston movable within the body;

means slidably coupling the piston to the valve means to engage the valve means near one end of the axial travel of the piston to move the valve means away from the seat including a stem centrally mounted on the valve means and having at its outer end an enlarged head, a hollow tube carried by the piston and receiving the valve stem head, and shoulder means on the piston engageable with the valve stem head as the piston approaches one end of its travel;

spring means normally urging the piston and the valve means toward the seat, said piston moving away from the seat in opposition to the spring means and in response to fluid pressure thereon exerted by fluid entering the body through the inlet opening;

abutment means comprising a fixed member and a movable member coupled to the piston to move axially therewith and also rotatable about the axis of the piston, said abutment means limiting travel of the piston away from the seat when the movable member is in at least one rotational position to position the piston short of moving the valve means away from the seat;

means for overcoming the limiting function of said abutment means in at least one rotational position of the movable member so as to permit travel of the piston away from the seat sufficient to move the valve away from the seat;

and cam and follower means rotating the movable abutment member during movement toward and away from the seat to successive rotational positions.

13. A cycling valve for controlling fluid flow, comprising the combination of:

a hollow body having spaced fluid inlet and outlet openings and a fluid port between said openings;

seat means at the port;

valve means movable into engagement with the seat and away therefrom to control fluid flow through the port;

a piston movable within the body;

means slidably coupling the piston to the valve means to engage the valve means near one end of the axial travel of the piston to move the valve means away from the seat;

spring means normally urging the piston and the valve means toward the seat, said piston moving away from the seat in opposition to the spring means and in response to fluid pressure thereon exerted by fluid entering the body through the inlet opening;

abutment means comprising a fixed member and a movable member coupled to the piston to move axially therewith and also rotatable about the axis of the piston, said abutment means limiting travel of the piston away from the seat when the movable member is in at least one rotational position to locate the piston short of moving the valve means away from the seat;

means for overcoming the limiting function of said abutment means in at least one rotational position of the movable member so as to permit travel of the piston away from the seat sufficient to move the valve away from the seat;

cam means including a sleeve coupled to the piston, and follower means cooperating with the cam means for rotating the sleeve during movement thereof toward and away from the seat to successive rotational positions;

and means substantially eliminating reverse torque applied to the cam means from the spring means.

References Cited in the file of this patent

UNITED STATES PATENTS

| | | |
|---|---|---|
| 2,678,845 | Fitter | May 18, 1954 |
| 2,793,908 | Carver | May 28, 1957 |
| 2,870,788 | Hull | Jan. 27, 1959 |
| 3,018,788 | Perlis | Jan. 30, 1962 |